(12) United States Patent
Lin

(10) Patent No.: US 11,029,510 B2
(45) Date of Patent: Jun. 8, 2021

(54) OPTICAL MODULE

(71) Applicant: QISDA CORPORATION, Taoyuan (TW)

(72) Inventor: Chih-Ying Lin, Taipei (TW)

(73) Assignee: QISDA CORPORATION, Taoyuan (TW)

( * ) Notice: Subject to any disclaimer, the term of this patent is extended or adjusted under 35 U.S.C. 154(b) by 79 days.

(21) Appl. No.: 16/423,144

(22) Filed: May 27, 2019

(65) Prior Publication Data

US 2020/0271918 A1 Aug. 27, 2020

(30) Foreign Application Priority Data

Feb. 26, 2019 (CN) .......................... 201910139912.X

(51) Int. Cl.
*G02B 7/02* (2021.01)
*G02B 26/08* (2006.01)
*G02B 26/02* (2006.01)

(52) U.S. Cl.
CPC ............... *G02B 26/08* (2013.01); *G02B 7/02* (2013.01); *G02B 26/02* (2013.01)

(58) Field of Classification Search
CPC ........ G02B 7/02; G02B 25/002; G02B 7/021; G02B 7/14; G02B 7/023; G11B 7/0932; G03B 17/14
USPC ................................... 359/811–830
See application file for complete search history.

(56) References Cited

FOREIGN PATENT DOCUMENTS

GB          2305232 A * 4/1997 ............. G02B 27/64

* cited by examiner

*Primary Examiner* — Dawayne Pinkney
(74) *Attorney, Agent, or Firm* — Winston Hsu

(57) ABSTRACT

An optical module includes a housing, an optical component, a first elastic member and a second elastic member. The housing has a first end, a second end and a through hole, wherein the first end is opposite to the second end. The optical component is disposed in the through hole. The optical component has a third end and a fourth end, wherein the third end is opposite to the fourth end, the third end protrudes from the first end, and the fourth end protrudes from the second end. The first elastic member is rotatably disposed on the first end and abuts against the third end. The second elastic member is rotatably disposed on the second end and abuts against the fourth end.

11 Claims, 13 Drawing Sheets

OPTICAL MODULE

BACKGROUND OF THE INVENTION

1. Field of the Invention

The invention relates to an optical module and, more particularly, to an optical module capable of adjusting an orientation of an optical component.

2. Description of the Prior Art

An infrared thermometer uses an infrared sensor to perform measurement for a distant point. Furthermore, the infrared thermometer is usually equipped with a visible laser emitter configured to inform a user which position the infrared sensor is aligned with. When assembling the visible laser emitter, an orientation of an optical axis has to be calibrated to be identical to the infrared sensor as far as possible, such that the position indicated by a laser point is the position measured by the infrared sensor. However, since the size of the laser emitter is very small, the optical axis has to be adjusted by additional and larger precision adjusting tool first. After adjustment, the laser emitter is fixed by glue or the like and then the adjusting tool needs to be removed. Accordingly, the assembly process is very inconvenient.

SUMMARY OF THE INVENTION

An objective of the invention is to provide an optical module capable of adjusting an orientation of an optical component, so as to solve the aforesaid problems.

According to an embodiment of the invention, an optical module comprises a housing, an optical component, a first elastic member and a second elastic member. The housing has a first end, a second end and a through hole, wherein the first end is opposite to the second end. The optical component is disposed in the through hole. The optical component has a third end and a fourth end, wherein the third end is opposite to the fourth end, the third end protrudes from the first end, and the fourth end protrudes from the second end. The first elastic member is rotatably disposed on the first end and abuts against the third end. The second elastic member is rotatably disposed on the second end and abuts against the fourth end.

As mentioned in the above, the invention disposes the first elastic member and the second elastic member on opposite ends of the housing, and the first elastic member and the second elastic member abut against opposite ends of the optical component, respectively. A user may selectively rotate the first elastic member and/or the second elastic member to push the optical component to move in a radial direction of the through hole, so as to adjust an orientation of the optical component rapidly and easily without the help of a complicated and external adjusting tool.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
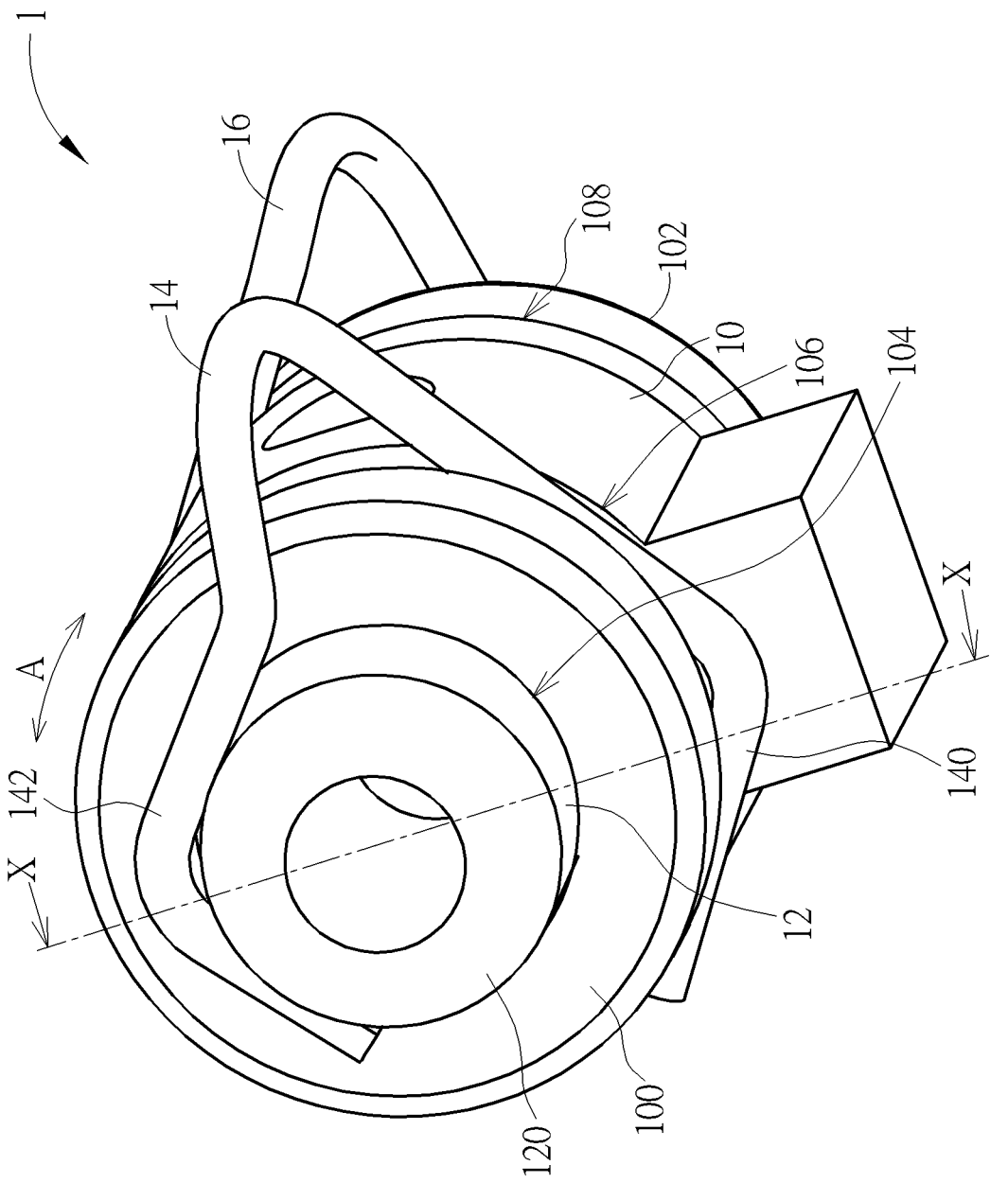
FIG. 1 is a perspective view illustrating an optical module according to an embodiment of the invention.
Figure 2:
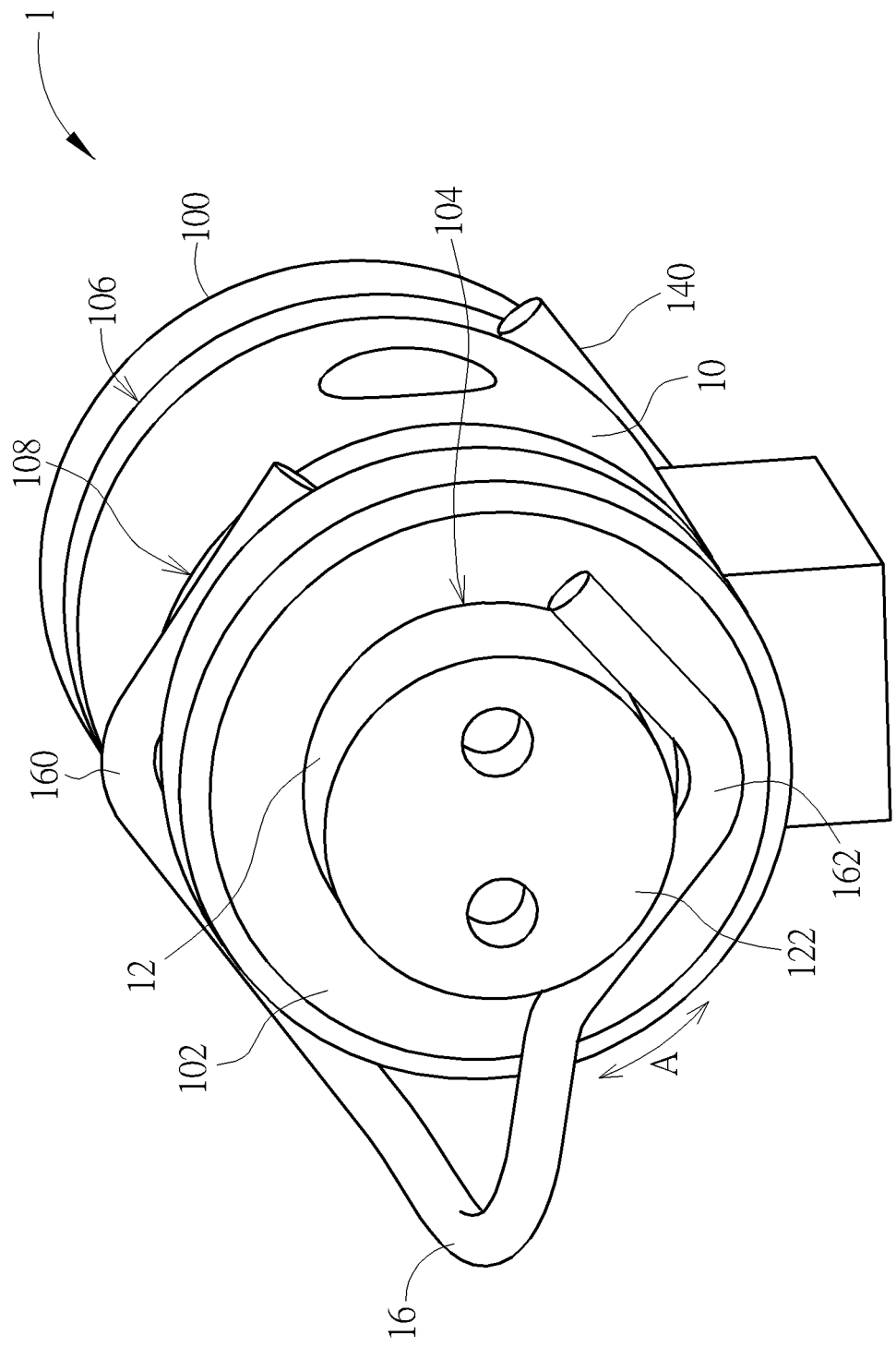
FIG. 2 is a perspective view illustrating the optical module shown in FIG. 1 from another viewing angle.
Figure 3:
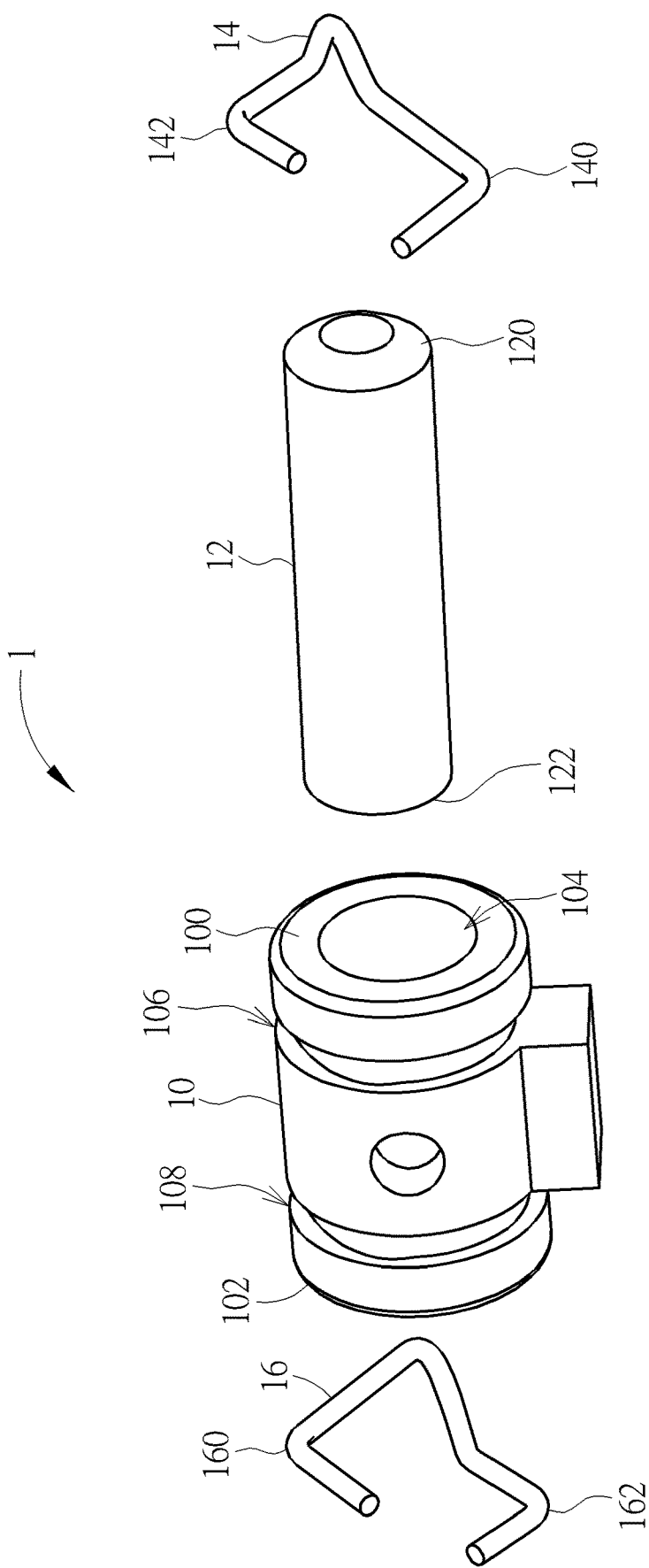
FIG. 3 is an exploded view illustrating the optical module shown in FIG. 1.
Figure 4:
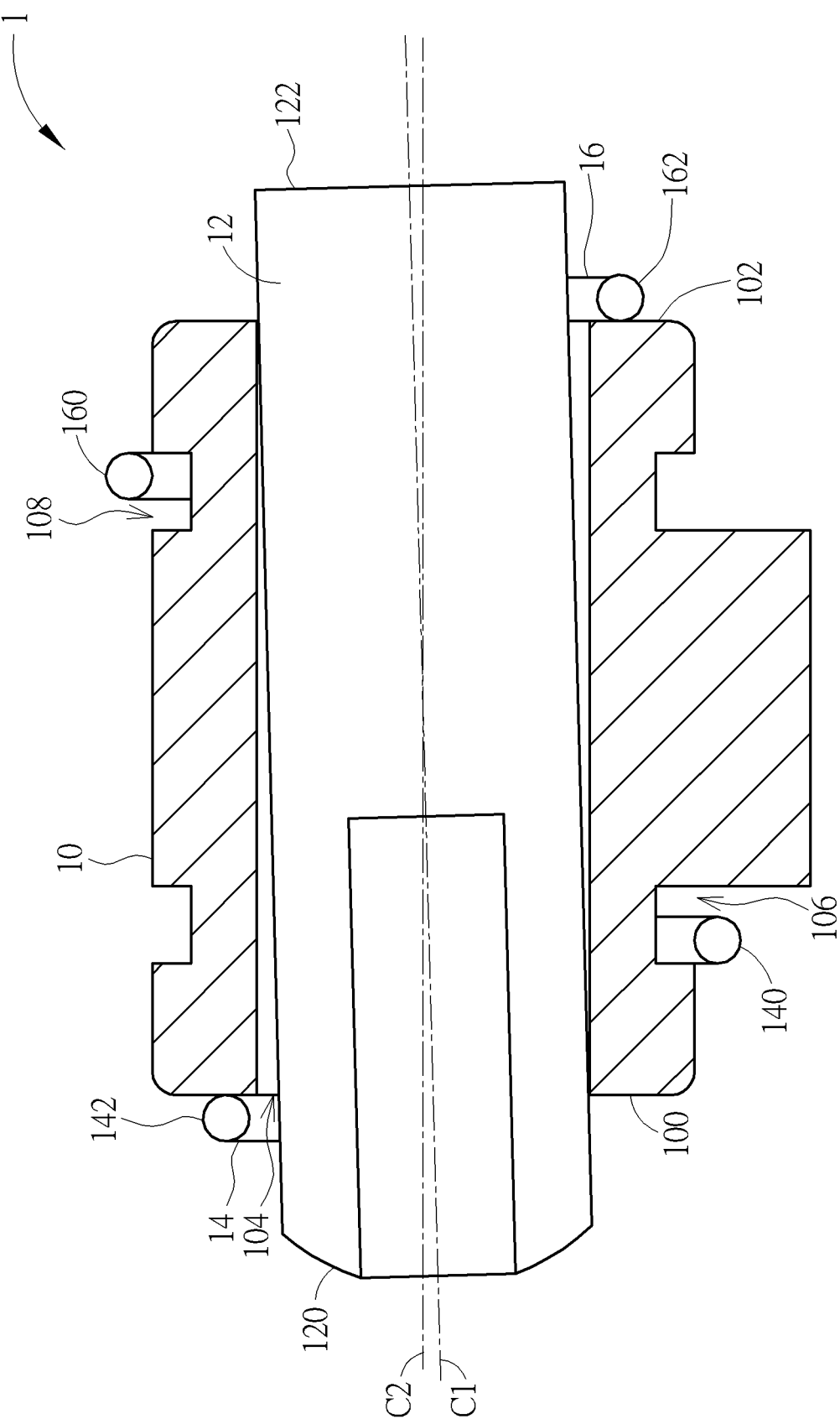
FIG. 4 is a sectional view illustrating the optical module shown in FIG. 1 along line X-X.

Referring to FIGS. 1 to 4, FIG. 1 is a perspective view illustrating an optical module 1 according to an embodiment of the invention, FIG. 2 is a perspective view illustrating the optical module 1 shown in FIG. 1 from another viewing angle, FIG. 3 is an exploded view illustrating the optical module 1 shown in FIG. 1, and FIG. 4 is a sectional view illustrating the optical module 1 shown in FIG. 1 along line X-X.

As shown in FIGS. 1 to 4, the optical module 1 comprises a housing 10, an optical component 12, a first elastic member 14 and a second elastic member 16. In this embodiment, the optical component 12 may be a laser emitter, a light emitting diode, a lens or other optical components. Furthermore, the first elastic member 14 and the second elastic member 16 may be springs or other elastic structures according to practical applications.

The housing 10 has a first end 100, a second end 102 and a through hole 104, wherein the first end 100 is opposite to the second end 102 and the through hole 104 penetrates the first end 100 and the second end 102. The optical component 12 has a third end 120 and a fourth end 122, wherein the third end 120 is opposite to the fourth end 122. In this embodiment, the optical component 12 may emit light (e.g. laser) from the third end 120. As shown in FIGS. 1 and 2, the optical component 12 is disposed in the through hole 104 of the housing 10, wherein the third end 120 of the optical component 12 protrudes from the first end 100 of the housing 10 and the fourth end 122 of the optical component 12 protrudes from the second end 102 of the housing 10.

The first elastic member 14 is rotatably disposed on the first end 100 of the housing 10 and abuts against the third end 120 of the optical component 12. In this embodiment, the first end 100 of the housing 10 may have a first restraining structure 106, wherein the first restraining structure 106 may be, but not limited to, a recess. As shown in FIG. 1, when the first elastic member 14 is disposed on the first end 100 of the housing 10, a first engaging end 140 of the first elastic member 14 engages with the first restraining structure 106, such that the first restraining structure 106 restrains the first elastic member 14 on the first end 100 and the first elastic member 14 is capable of rotating with respect to the first restraining structure 106 in a direction of a double-headed arrow A.

When the first elastic member 14 is disposed on the first end 100 of the housing 10, a first contact end 142 of the first elastic member 14 may abut against the third end 120 of the optical component 12 by at least two contact points. In this embodiment, the first contact end 142 of the first elastic member 14 is V-shaped. Accordingly, the first contact end 142 of the first elastic member 14 abuts against the third end 120 of the optical component 12 by two contact points. Furthermore, the first engaging end 140 of the first elastic member 14 may also be V-shaped and abut against the housing 10 by two contact points.

The second elastic member 16 is rotatably disposed on the second end 102 of the housing 10 and abuts against the fourth end 122 of the optical component 12. In this embodiment, the second end 102 of the housing 10 may have a second restraining structure 108, wherein the second restraining structure 108 may be, but not limited to, a recess. As shown in FIG. 2, when the second elastic member 16 is disposed on the second end 102 of the housing 10, a second engaging end 160 of the second elastic member 16 engages with the second restraining structure 108, such that the second restraining structure 108 restrains the second elastic member 16 on the second end 102 and the second elastic member 16 is capable of rotating with respect to the second restraining structure 108 in a direction of a double-headed arrow A.

When the second elastic member 16 is disposed on the second end 102 of the housing 10, a second contact end 162 of the second elastic member 16 may abut against the fourth end 122 of the optical component 12 by at least two contact points. In this embodiment, the second contact end 162 of the second elastic member 16 is V-shaped. Accordingly, the second contact end 162 of the second elastic member 16 abuts against the fourth end 122 of the optical component 12 by two contact points. Furthermore, the second engaging end 160 of the second elastic member 16 may also be V-shaped and abut against the housing 10 by two contact points.

As shown in FIG. 4, when the optical component 12 is disposed in the through hole 104 of the housing 10, an assembly clearance exists between the optical component 12 and the through hole 104 of the housing 10, such that an optical axis C1 of the optical component 12 may tilt with respect to a central axis C2 of the through hole 104 after assembly. At this time, a user may rotate the first elastic member 14 to generate an elastic force to push the third end 120 of the optical component 12 in a radial direction of the through hole 104. Furthermore, the user may also rotate the second elastic member 16 to generate an elastic force to push the fourth end 122 of the optical component 12 in a radial direction of the through hole 104.

When the user rotates the first elastic member 14 and the second elastic member 16 to push the third end 120 and the fourth end 122 of the optical component 12 in identical or different radial direction, the user can adjust a tilt amount of the optical axis C1 of the optical component 12 with respect to the central axis C2 of the through hole 104 in a desired direction. For example, when the third end 120 is pushed downwardly and the fourth end 122 is pushed upwardly (i.e. the third end 120 and the fourth end 122 are pushed in opposite directions with 180 degrees according to a viewing angle of the back of the optical component 12), the optical axis C1 tilts downwardly with the largest tile amount with respect to the central axis C2. Furthermore, when the third end 120 is pushed downwardly and the fourth end 122 is also pushed downwardly (i.e. the third end 120 and the fourth end 122 are pushed in identical directions with 0 degree according to a viewing angle of the back of the optical component 12), the optical axis C1 is parallel to the central axis C2 with the smallest tile amount. When the third end 120 and the fourth end 122 are pushed in other directions with a difference between 0 and 180 degrees according to a viewing angle of the back of the optical component 12, the tilt amount of the optical axis C1 with respect to the central axis C2 may be between 0 and the largest tile amount.

Figure 5:
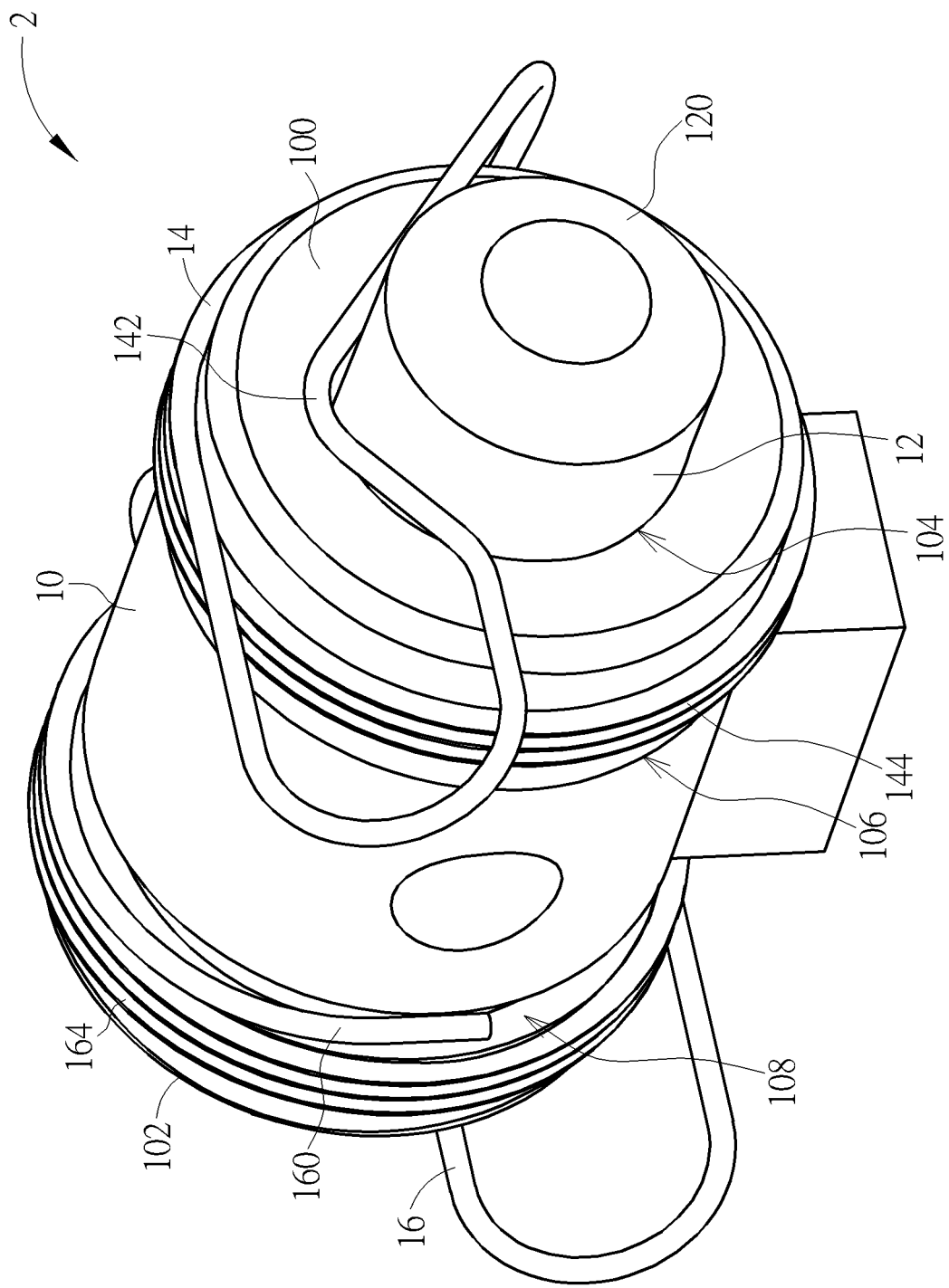
FIG. 5 is a perspective view illustrating an optical module according to another embodiment of the invention.
Figure 6:
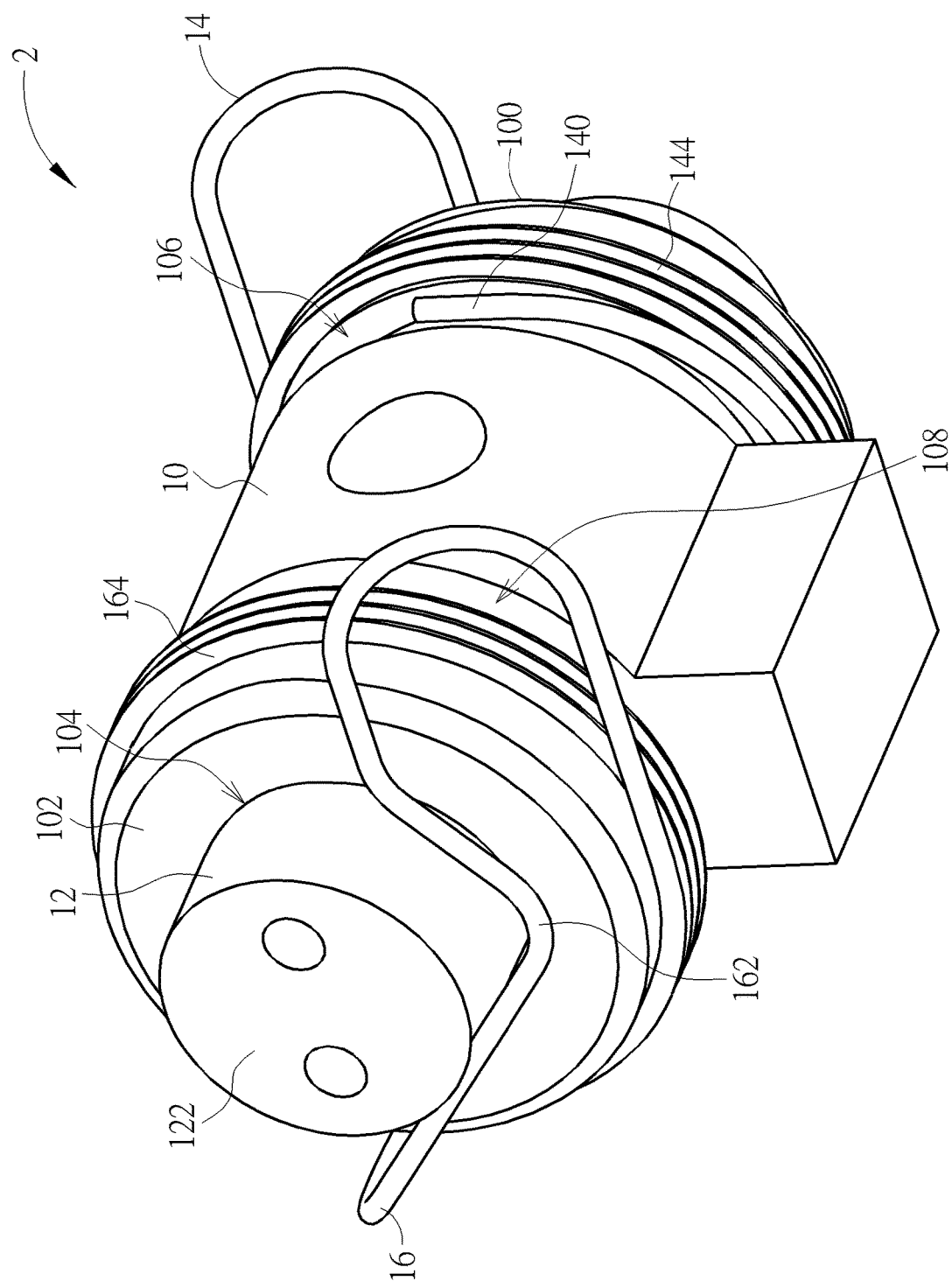
FIG. 6 is a perspective view illustrating the optical module shown in FIG. 5 from another viewing angle.

Referring to FIGS. 5 and 6, FIG. 5 is a perspective view illustrating an optical module 2 according to another embodiment of the invention and FIG. 6 is a perspective view illustrating the optical module 2 shown in FIG. 5 from another viewing angle. The main difference between the optical module 2 and the aforesaid optical module 1 is that the first elastic member 14 of the optical module 2 has a plurality of first ring-shaped portions 144 and the second elastic member 16 of the optical module 2 has a plurality of second ring-shaped portions 164, wherein the first ring-shaped portions 144 of the first elastic member 14 are disposed on the first end 100 of the housing 10 and the second ring-shaped portions 164 of the second elastic member 16 are disposed on the second end 102 of the housing 10, as shown in FIGS. 5 and 6. Accordingly, the first elastic member 14 and the second elastic member 16 may be assembled to the housing 10 more easily.

Figure 7:
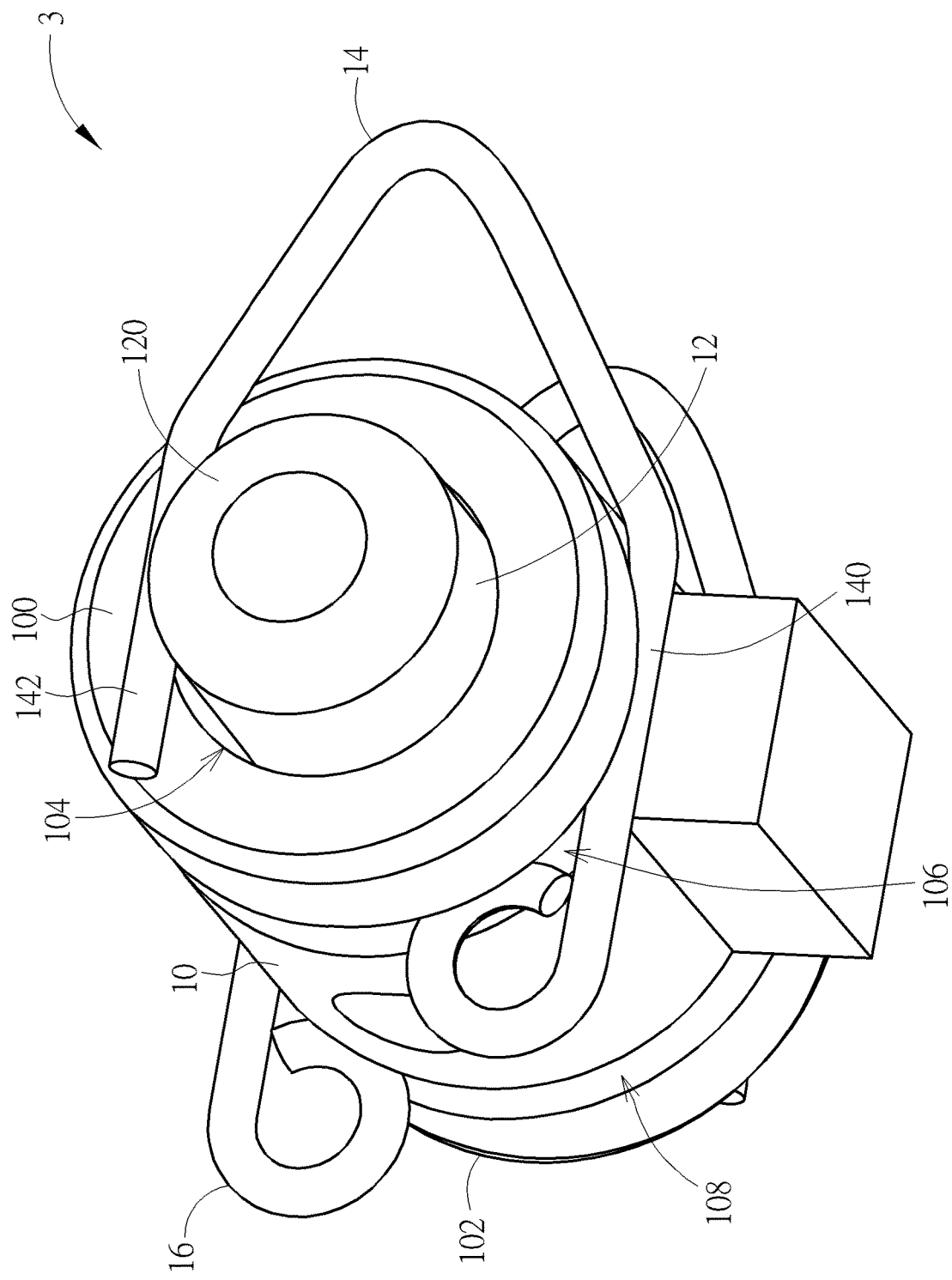
FIG. 7 is a perspective view illustrating an optical module according to another embodiment of the invention.
Figure 8:
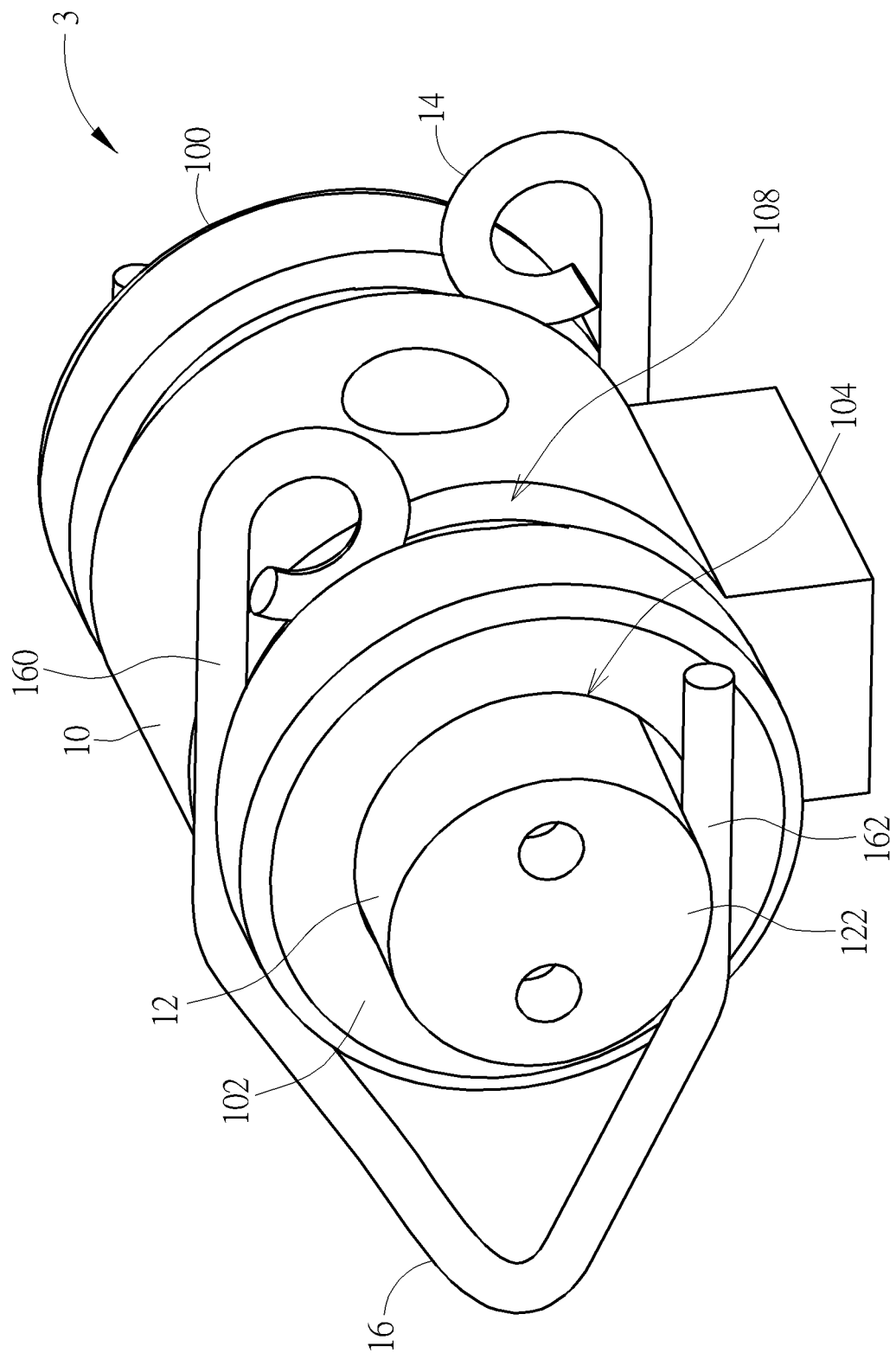
FIG. 8 is a perspective view illustrating the optical module shown in FIG. 7 from another viewing angle.

Referring to FIGS. 7 and 8, FIG. 7 is a perspective view illustrating an optical module 3 according to another embodiment of the invention and FIG. 8 is a perspective view illustrating the optical module 3 shown in FIG. 7 from another viewing angle. The main difference between the optical module 3 and the aforesaid optical module 1 is that the first contact end 142 of the first elastic member 14 of the optical module 3 is straight and the second contact end 162 of the second elastic member 16 of the optical module 3 is also straight, as shown in FIGS. 7 and 8. Accordingly, the first contact end 142 of the first elastic member 14 abuts against the third end 120 of the optical component 12 by one contact point and the second contact end 162 of the second elastic member 16 also abuts against the fourth end 122 of the optical component 12 by one contact point. Furthermore, the first engaging end 140 of the first elastic member 14 of the optical module 3 may also be straight and abut against the housing 10 by one contact point. Needless to say, the second engaging end 160 of the second elastic member 16 of the optical module 3 may also be straight and abut against the housing 10 by one contact point.

Figure 9:
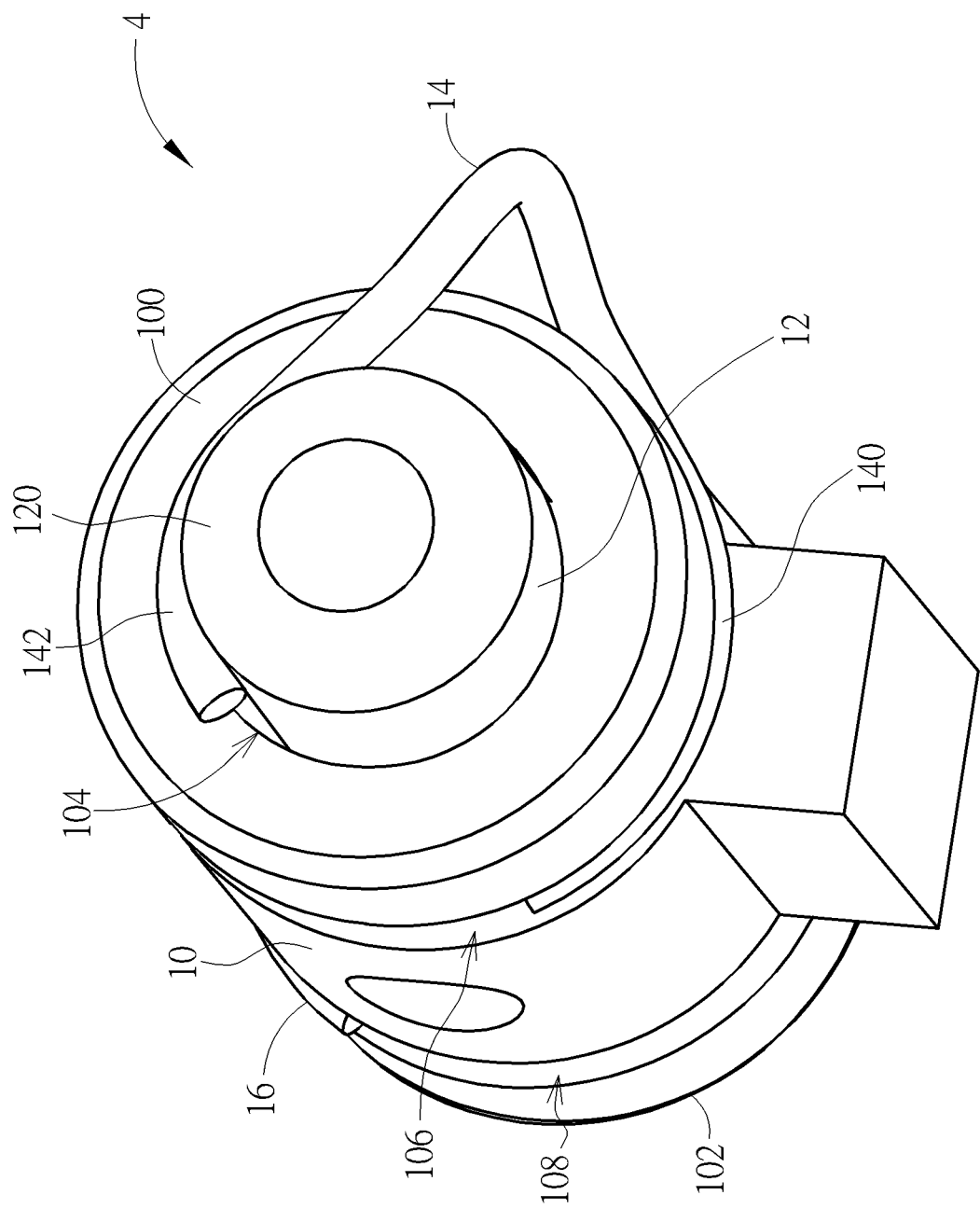
FIG. 9 is a perspective view illustrating an optical module according to another embodiment of the invention.
Figure 10:
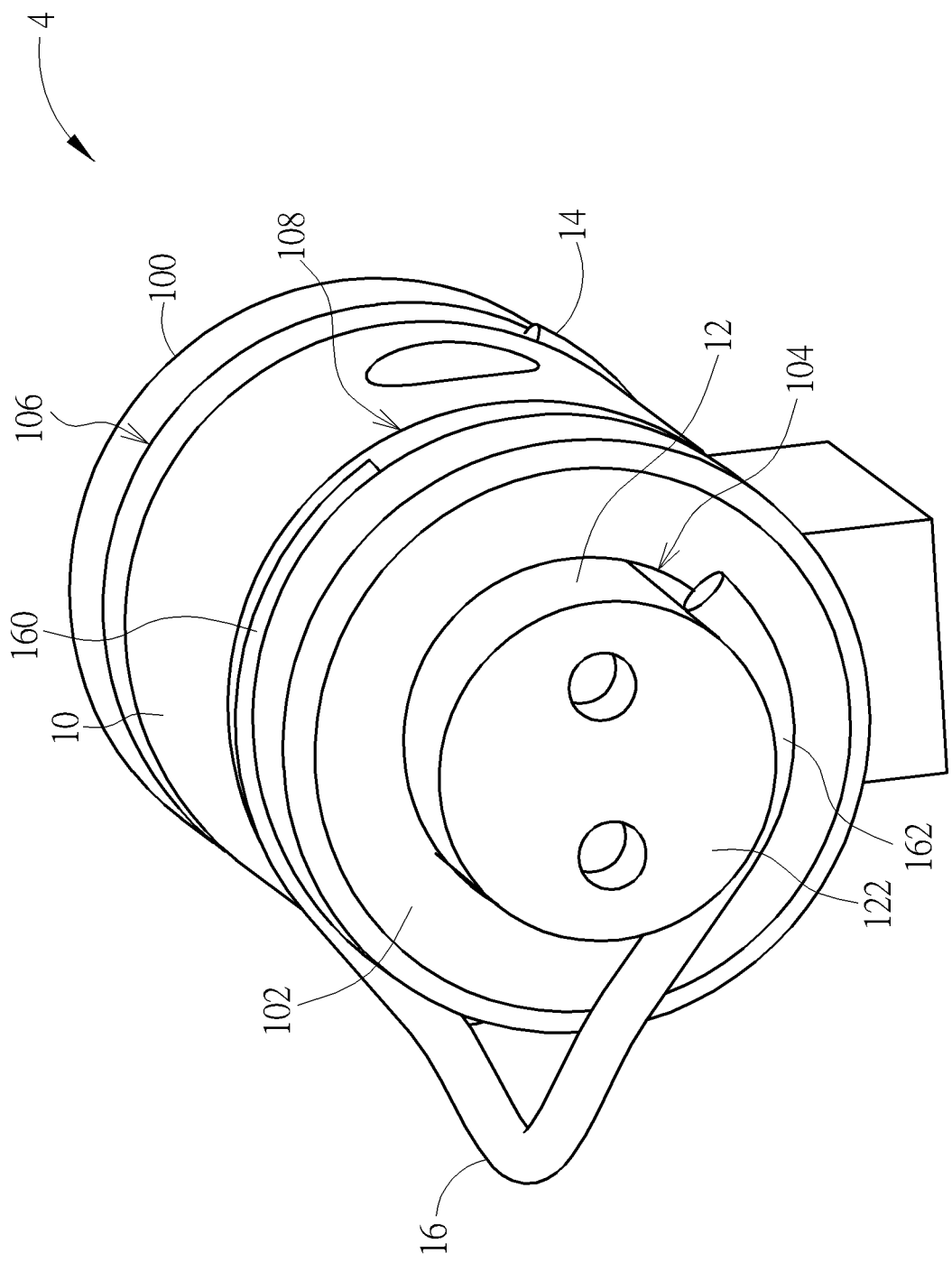
FIG. 10 is a perspective view illustrating the optical module shown in FIG. 9 from another viewing angle.

Referring to FIGS. 9 and 10, FIG. 9 is a perspective view illustrating an optical module 4 according to another embodiment of the invention and FIG. 10 is a perspective view illustrating the optical module 4 shown in FIG. 9 from another viewing angle. The main difference between the optical module 4 and the aforesaid optical module 1 is that the first contact end 142 of the first elastic member 14 of the optical module 4 is curved and the second contact end 162 of the second elastic member 16 of the optical module 4 is also straight, as shown in FIGS. 9 and 10. Accordingly, the first contact end 142 of the first elastic member 14 abuts against the third end 120 of the optical component 12 by a curved line (i.e. infinite contact points) and the second contact end 162 of the second elastic member 16 also abuts against the fourth end 122 of the optical component 12 by a curved line (i.e. infinite contact points). Furthermore, the first engaging end 140 of the first elastic member 14 of the optical module 3 may also be curved and abut against the housing 10 by a curved line. Needless to say, the second engaging end 160 of the second elastic member 16 of the optical module 3 may also be curved and abut against the housing 10 by a curved line.

Figure 11:
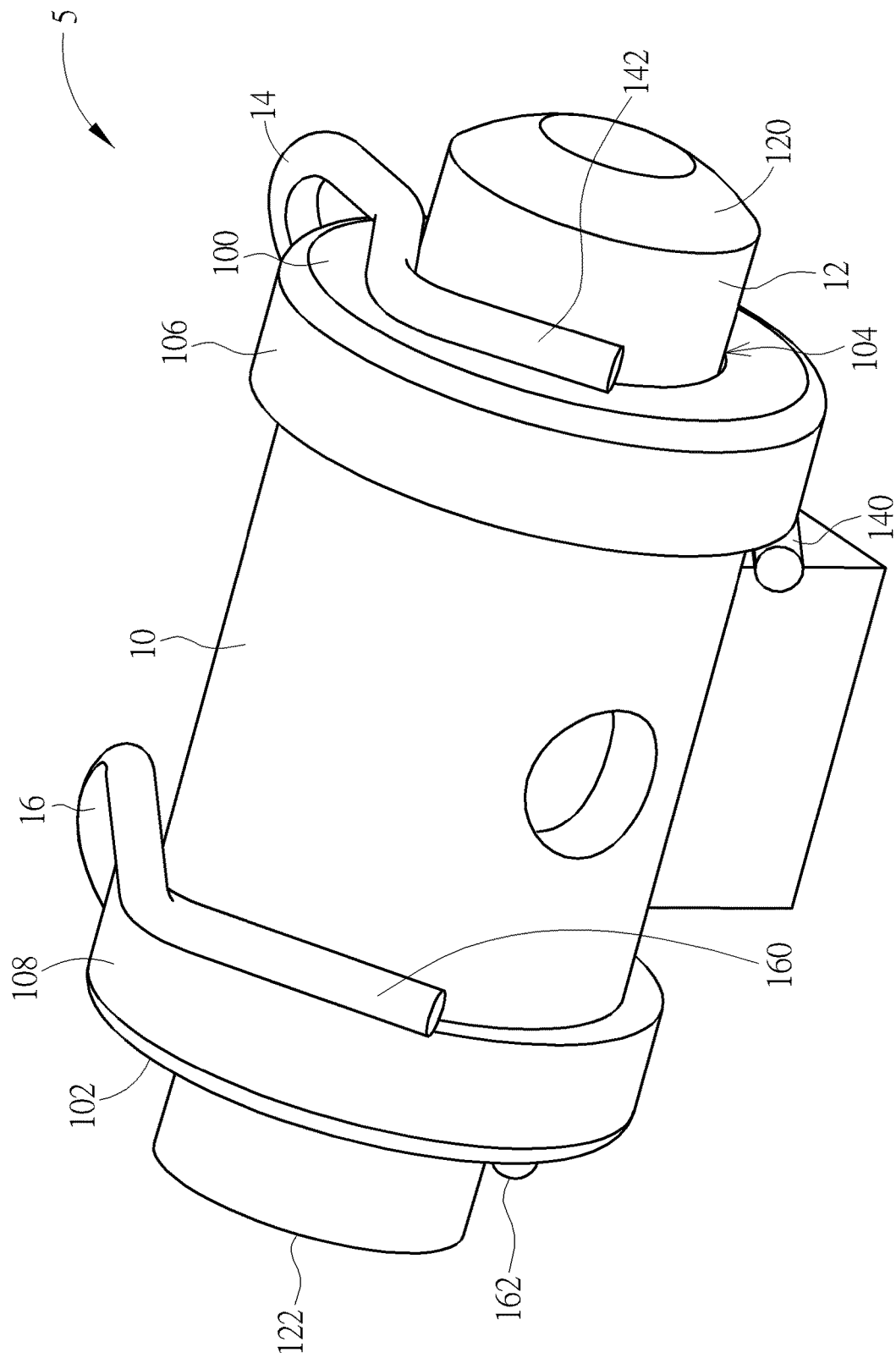
FIG. 11 is a perspective view illustrating an optical module according to another embodiment of the invention.

Referring to FIG. 11, FIG. 11 is a perspective view illustrating an optical module 5 according to another embodiment of the invention. The main difference between the optical module 5 and the aforesaid optical module 1 is that the first restraining structure 106 and the second restraining structure 108 of the housing 10 of the optical module 5 are flanges of the first end 100 and the second end 102, as shown in FIG. 11.

Figure 12:
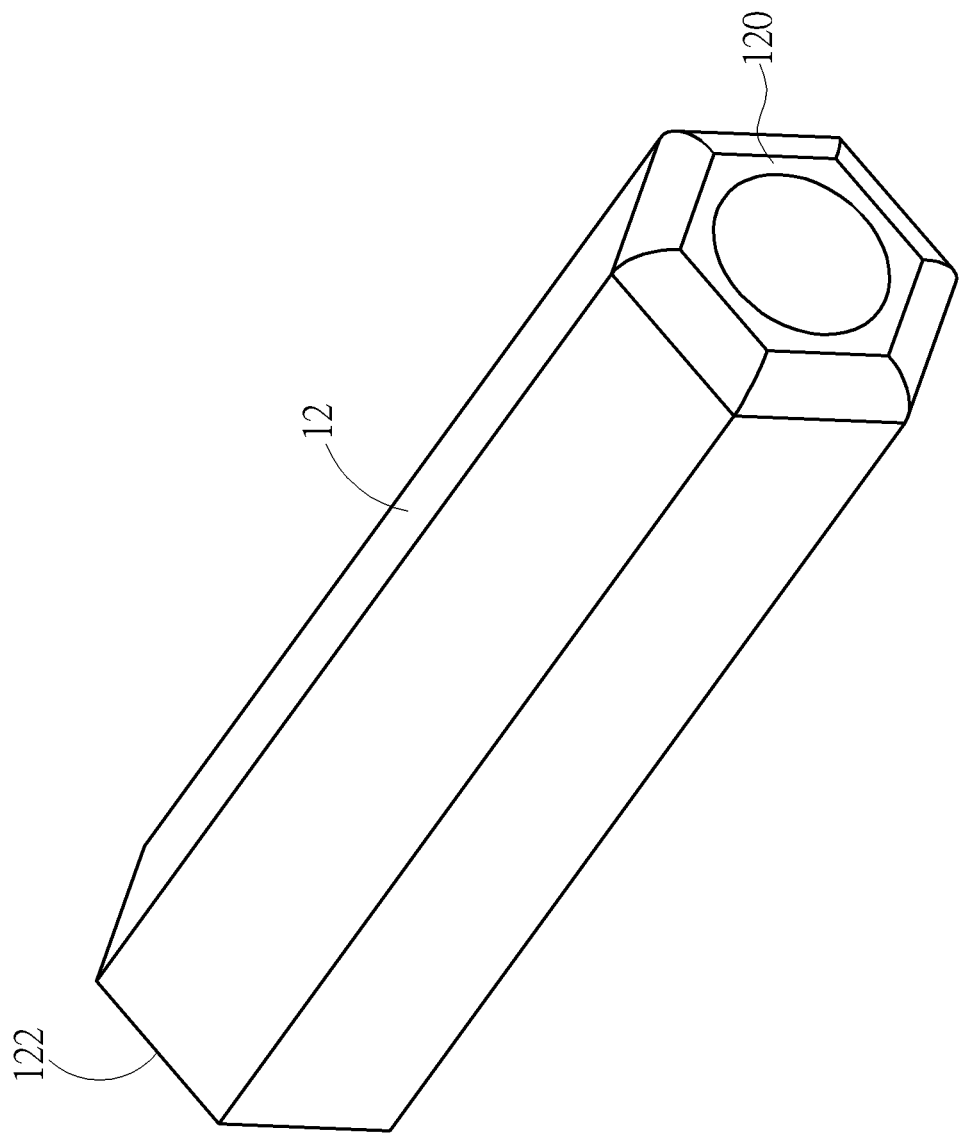
FIG. 12 is a perspective view illustrating an optical component according to another embodiment of the invention.

Referring to FIG. 12, FIG. 12 is a perspective view illustrating an optical component 12 according to another embodiment of the invention. As sown in FIG. 12, a periphery of the optical component 12 may be polygonal.

Figure 13:
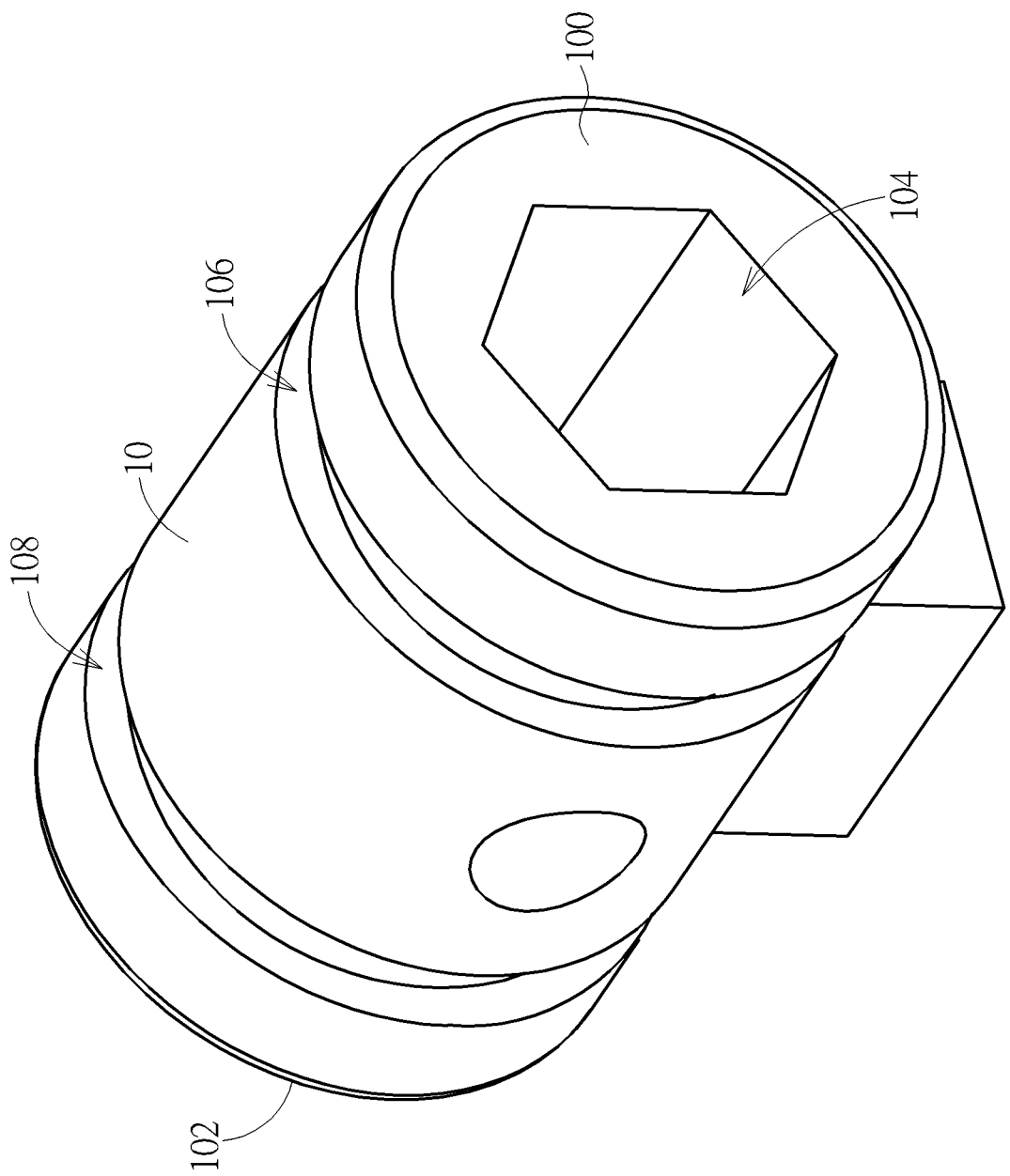
FIG. 13 is a perspective view illustrating a housing according to another embodiment of the invention.

Referring to FIG. 13, FIG. 13 is a perspective view illustrating a housing 10 according to another embodiment of the invention. As sown in FIG. 13, the through hole 104 of the housing 10 may be polygonal.

Therefore, according to the aforesaid embodiments, the periphery of the optical component 12 may be circular or polygonal, and the through hole 104 of the housing 10 may also be circular or polygonal. Furthermore, a periphery of the housing 10 may also be circular or polygonal.

As mentioned in the above, the invention disposes the first elastic member and the second elastic member on opposite ends of the housing, and the first elastic member and the second elastic member abut against opposite ends of the optical component, respectively. A user may selectively rotate the first elastic member and/or the second elastic member to push the optical component to move in a radial direction of the through hole, so as to adjust an orientation of the optical component rapidly and easily without the help of a complicated and external adjusting tool.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical module comprising:
    a housing having a first end, a second end and a through hole, the first end being opposite to the second end;
    an optical component disposed in the through hole, the optical component having a third end and a fourth end, the third end being opposite to the fourth end, the third end protruding from the first end, the fourth end protruding from the second end;
    a first elastic member rotatably disposed on the first end and abutting against the third end; and
    a second elastic member rotatably disposed on the second end and abutting against the fourth end to be spaced apart from the first elastic member on the housing, to push the third end of the optical component in a radial direction of the through hole via an elastic force provided by the first elastic member and to push the fourth end of the optical component in the radial direction of the through hole via an elastic force provided by the second elastic member.

2. The optical module of claim 1, wherein the first end has a first restraining structure and the first restraining structure restrains the first elastic member on the first end.

3. The optical module of claim 2, wherein the first restraining structure is a recess.

4. The optical module of claim 1, wherein the second end has a second restraining structure and the second restraining structure restrains the second elastic member on the second end.

5. The optical module of claim 4, wherein the second restraining structure is a recess.

6. The optical module of claim 1, wherein a first contact end of the first elastic member abuts against the third end by at least one contact point.

7. The optical module of claim 6, wherein the first contact end is V-shaped, straight or curved.

8. The optical module of claim 1, wherein a second contact end of the second elastic member abuts against the fourth end by at least one contact point.

9. The optical module of claim 8, wherein the second contact end is V-shaped, straight or curved.

10. The optical module of claim 1, wherein a periphery of the housing is circular or polygonal, the through hole is circular or polygonal, and a periphery of the optical component is circular or polygonal.

11. The optical module of claim 1, wherein the optical component is a laser emitter, a light emitting diode or a lens.

* * * * *